US012632372B2

(12) United States Patent
Xia et al.

(10) Patent No.: US 12,632,372 B2
(45) Date of Patent: May 19, 2026

(54) IMAGE PROCESSING CHIP AND OPERATION METHOD THEREOF

(71) Applicant: SigmaStar Technology Ltd., Xiamen (CN)

(72) Inventors: Jiang-Nan Xia, Shanghai (CN); Wei Zhang, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 80 days.

(21) Appl. No.: 18/654,013

(22) Filed: May 3, 2024

(65) Prior Publication Data

US 2024/0411683 A1 Dec. 12, 2024

(30) Foreign Application Priority Data

Jun. 7, 2023 (CN) .......................... 202310671155.7

(51) Int. Cl.
*G06F 12/02* (2006.01)

(52) U.S. Cl.
CPC ...... *G06F 12/023* (2013.01); *G06F 2212/251* (2013.01)

(58) Field of Classification Search
None
See application file for complete search history.

(56) References Cited

U.S. PATENT DOCUMENTS

2001/0016910 A1* 8/2001 Tanimoto .............. G06F 9/3879
712/E9.067
2018/0081709 A1* 3/2018 Okazaki ................. G06F 9/461

2019/0188162 A1* 6/2019 Kwon ................... G06F 3/0673
2020/0192830 A1* 6/2020 Homma ................ G06F 9/4837
2020/0321051 A1* 10/2020 Suh ....................... G11C 7/1045
2023/0035779 A1* 2/2023 Moon .................. H04N 19/172
2023/0171416 A1* 6/2023 Yu ......................... H04N 19/182
375/240.02

OTHER PUBLICATIONS

OA letter of a counterpart TW application (appl. No. 112121909) mailed on Jan. 11, 2024. Summary of the TW OA letter: Claim(s) 1, 5-11, and 15-17 is/are rejected under Patent Law Article 22(2) as allegedly being unpatentable over reference 1 (US 2023/0171416 A1) and reference 2 (US 2018/0081709 A1).

* cited by examiner

*Primary Examiner* — Baboucarr Faal

(74) *Attorney, Agent, or Firm* — WPAT, PC

(57) ABSTRACT

An image processing chip is coupled to an external memory and includes a processing circuit and an encoder. The processing circuit is configured to write data to be encoded into a memory address of the external memory. The encoder includes first and second registers, a data input circuit, and an encoding circuit. The first register is configured to store the memory address under control of the processing circuit. The data input circuit is configured to read the data to be encoded from the external memory according to the memory address in the first register and write the data to be encoded into the second register. The encoding circuit is configured to perform an encoding operation according to the data to be encoded in the second register to generate encoded data. The encoder stores the encoded data or an output data derived from the encoded data in the external memory.

18 Claims, 13 Drawing Sheets

S610 writing at least one data to be encoded into a memory address of an external memory S616 determining whether to update the at least one data to be encoded in a data group according to the flag S610 to S660

S680 storing a supplementary data related to the encoding operation in the external memory S690 reading the output data and/or the supplementary data from the external memory according to an interrupt

IMAGE PROCESSING CHIP AND OPERATION METHOD THEREOF

This application claims the benefit of China application Serial No. 202310671155.7, filed on Jun. 7, 2023, the subject matter of which is incorporated herein by reference.

BACKGROUND OF THE INVENTION

1. Field of the Invention

The present invention generally relates to image processing, and, more particularly, to image processing chips and operation methods thereof.

2. Description of Related Art

When there are two groups of image data to be encoded in real time, the encoding circuit usually encodes the two groups of image data alternately, rather than finishing encoding one group of image data before encoding the other group of image data. Time Division Multiplexing (TDM) is the use of the same hardware resource to process different tasks at different times.

FIG. 1 shows a schematic diagram of conventional TDM. "SW" indicates the timing of software, while "HW" indicates the timing of hardware. The white tasks (including the task 110a, the task 110b, and the task 110c) correspond to the first group of image data (e.g., one task corresponds to encoding one frame of image data), and the gray tasks (including the task 120a and the task 120b) correspond to the second group of image data. Tasks of the same group of image data are related, but the tasks of the first group of image data are independent of the tasks of the second group of image data.

It is assumed in FIG. 1 that sufficient software resources are available (e.g., the processor has relatively large computing power), allowing the software to start preparing the task 110a and the task 120a simultaneously (at the time point TO). After preparing the task 110a (e.g., after the necessary data and parameters for encoding a frame are prepared), the software can immediately transfer the task 110a to the hardware for execution (at the time point T1). However, when the software finishes preparing the task 120a (at the time point T1), it cannot immediately transfer the task 120a to the hardware for execution because the hardware is still executing the task 110a. The software must wait until the hardware finishes the task 110a (at the time point T2) and the result of the task 110a is completely obtained by the software (at the time point T3) before it can transfer the task 120a to the hardware for execution. Therefore, there is an idle time SGp for the software. On the other hand, because the hardware cannot execute the task 120a immediately after finishing the task 110a, there is an idle time HGp. The idle time SGp and/or the idle time HGp cause(s) a waste of software resources and/or hardware resources, degrading the performance of the electronic device. Moreover, the conventional method uses resource locks to prevent different tasks from using the same hardware at the same time; however, resource locks add complexity to the software and can easily lead to uneven resource allocation.

SUMMARY OF THE INVENTION

In view of the issues of the prior art, an object of the present invention is to provide an image processing chip and an operation method thereof, so as to make an improvement to the prior art.

According to one aspect of the present invention, an image processing chip is provided. The image processing chip is coupled to an external memory and includes a processing circuit and an encoder. The processing circuit is configured to write a data to be encoded into a memory address of the external memory. The encoder includes a first register, a second register, a data input circuit, and an encoding circuit. The first register is configured to store the memory address under control of the processing circuit. The data input circuit is configured to read the data to be encoded from the external memory according to the memory address in the first register and write the data to be encoded into the second register. The encoding circuit is configured to perform an encoding operation according to the data to be encoded in the second register to generate an encoded data. The encoder stores the encoded data or an output data derived from the encoded data in the external memory.

According to another aspect of the present invention, an operation method of an image processing chip is provided. The image processing chip is coupled to an external memory and includes a first register and a second register. The operation method includes the following steps: (A) writing a data to be encoded into a memory address of the external memory; (B) writing the memory address into the first register; (C) reading the data to be encoded from the external memory according to the memory address in the first register and writing the data to be encoded into the second register; (D) performing an encoding operation according to the data to be encoded in the second register to generate an encoded data; and (E) storing the encoded data or an output data derived from the encoded data in the external memory.

The technical means embodied in the embodiments of the present invention can solve at least one of the problems of the prior art. Therefore, compared to the prior art, the present invention can reduce idle time and improve performance.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an image processing chip and an operation method thereof. On account of that some or all elements of the image processing chip could be known, the detail of such elements is omitted provided that such detail has little to do with the features of this disclosure, and that this omission nowhere dissatisfies the specification and enablement requirements. Some or all of the processes of the operation method of the image processing chip may be implemented by software and/or firmware and can be performed by the image processing chip or its equivalent. A person having ordinary skill in the art can choose components or steps equivalent to those described in this specification to carry out the present invention, which means that the scope of this invention is not limited to the embodiments in the specification.

Figure 1:
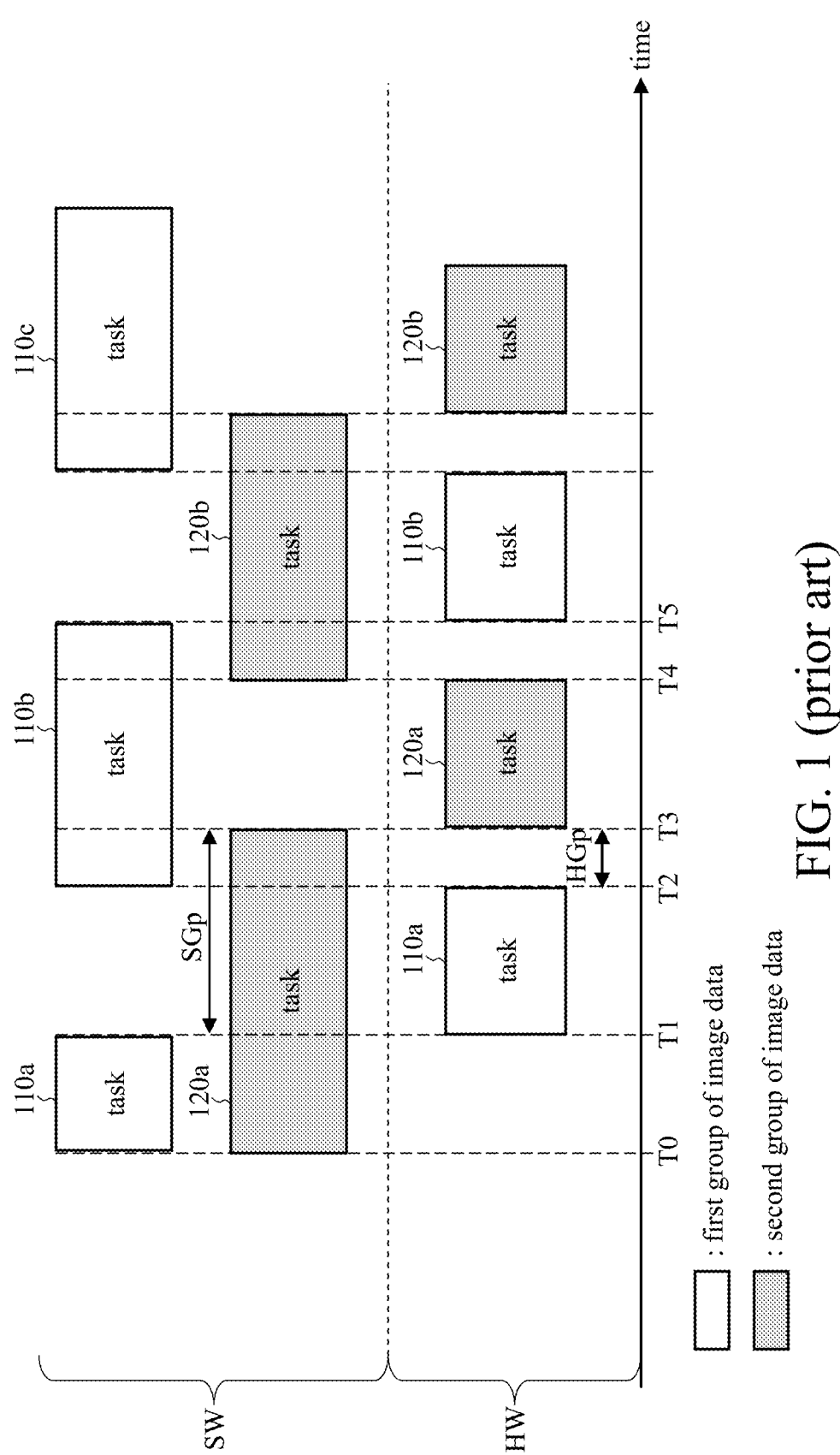
FIG. 1 shows a schematic diagram of conventional Time Division Multiplexing (TDM).
Figure 2:
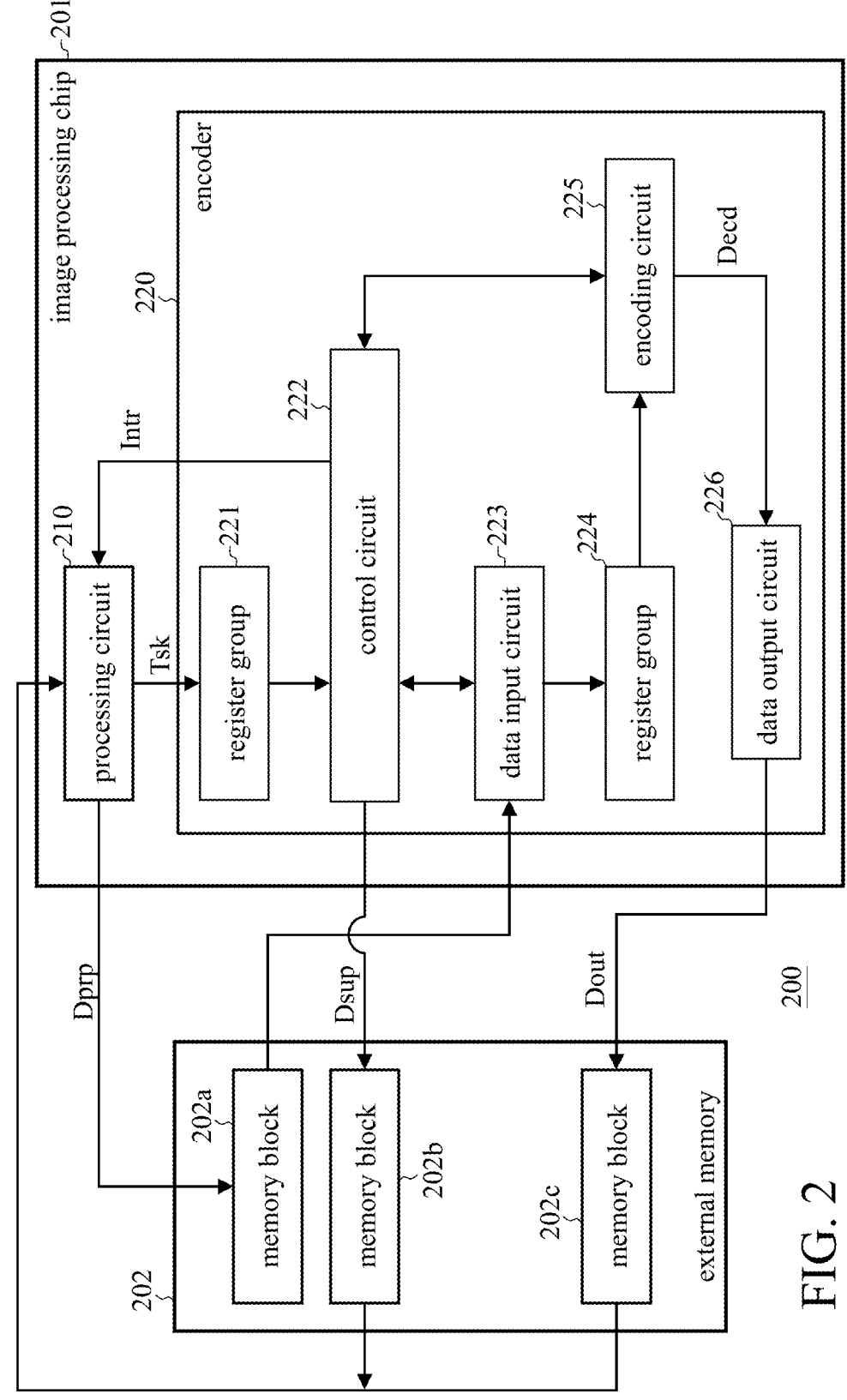
FIG. 2 is a functional block diagram of an electronic device according to an embodiment of the present invention.

Reference is made to FIG. 2, which is a functional block diagram of an electronic device 200 according to an embodiment of the present invention. The electronic device 200 includes an image processing chip 201 and an external memory 202. The image processing chip 201 and the external memory 202 are coupled or electrically connected to each other. The external memory 202 may be a volatile memory (e.g., a Dynamic Random Access Memory, DRAM). In some embodiments, the external memory 202 stores a plurality of program instructions or codes, and the image processing chip 201 implements its functions (including, but not limited to, image encoding) by executing the program instructions or codes.

The image processing chip 201 includes a processing circuit 210 and an encoder 220. The encoder 220 includes a register group 221, a control circuit 222, a data input circuit 223, a register group 224, an encoding circuit 225, and a data output circuit 226. The processing circuit 210 and the encoder 220 are coupled or electrically connected to each other.

The processing circuit 210 generates at least one group of preparation data Dprp and stores the at least one group of preparation data Dprp in the memory block 202a of the external memory 202. A group of preparation data Dprp contains the data to be encoded. The data to be encoded is the data (including, but not limited to, encoding parameters and pixel data) required to perform an encoding task (e.g., encoding a frame of a group of image data). The processing circuit 210 also generates at least one encoding task Tsk and stores the at least one encoding task Tsk in the register group 221 of the encoder 220. An encoding task Tsk corresponds to a group of preparation data Dprp.

The encoder 220 performs encoding operations according to the encoding task Tsk and the preparation data Dprp. More specifically, the control circuit 222 checks whether there is a to-be-processed encoding task Tsk in the register group 221. If there is a to-be-processed encoding task Tsk, the control circuit 222 obtains the corresponding preparation data Dprp from the external memory 202 according to the contents of the register group 221. The details will be discussed in detail below with reference to FIGS. 3A to 3B.

Figure 3A:
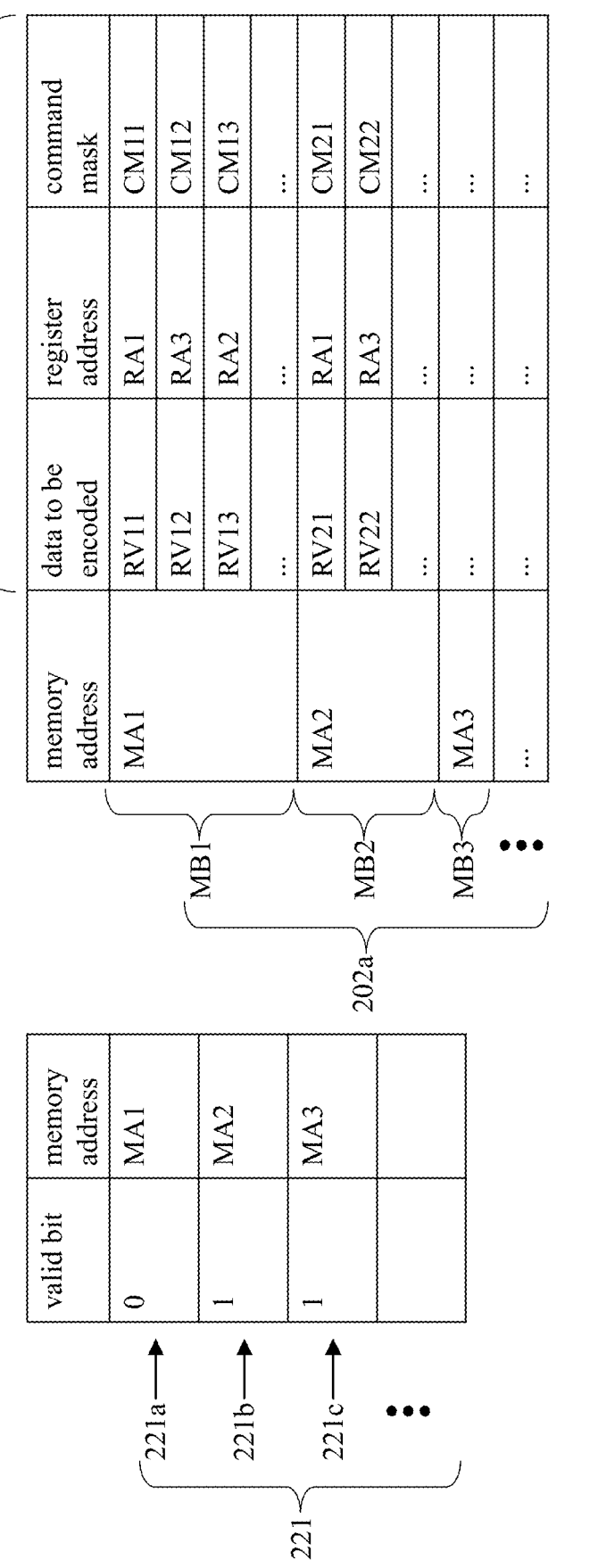
FIG. 3A is a schematic diagram of the contents of the register group 221 and the memory block 202a according to an embodiment of the present invention.

Reference is made to FIG. 3A, which is a schematic diagram of the contents of the register group 221 and the memory block 202a according to an embodiment of the present invention. The register group 221 may include multiple task registers (e.g., the task register 221a, the task register 221b, and the task register 221c), each of which is used to store an encoding task Tsk. Each register stores a valid bit and a memory address. As shown in the figure, the valid bit and the memory address stored in the task register 221a are 0 and MA1 respectively; the valid bit and the memory address stored in the task register 221b are 1 and MA2 respectively; the valid bit and the memory address stored in the task register 221c are 1 and MA3 respectively. Valid bits of I/O indicate incompletion/completion of the corresponding encoding task Tsk. When the processing circuit 210 writes the preparation data Dprp corresponding to a new (yet to be processed) encoding task Tsk into the memory block 202a, the processing circuit 210 sets the valid bit corresponding to the encoding task Tsk to 1. The control circuit 222 searches the register group 221 for the encoding task Tsk with a valid bit of 1 (e.g., the encoding task Tsk stored in the task register 221b) and reads the corresponding preparation data Dprp (including the data to be encoded, register address(es), and command mask(s)) from the memory block 202a according to the memory address of the encoding task Tsk (e.g., the memory address MA2). After accessed the task register whose valid bit is 1, the control circuit 222 changes the valid bit of that task register to 0.

In some embodiments, the register group 221 may contain only one register. That is to say, the processing circuit 210 and the control circuit 222 access that register in turn.

Continuing with FIG. 3A, the memory block 202a includes a plurality of memory sub-blocks (MB1, MB2, MB3). The memory address MA1, the memory address MA2, and the memory address MA3 are the starting address of the memory sub-block MB1, the memory sub-block MB2, and the memory sub-block MB3 respectively. A memory sub-block stores a group of preparation data Dprp. A group of preparation data Dprp includes multiple data to be encoded (i.e., the aforementioned encoding parameters or pixel data). Each data to be encoded corresponds to a register address and a command mask. For example, the preparation data Dprp stored in the memory sub-block MB1 (corresponding to the task register 221a) includes the data to be encoded RV11, the data to be encoded RV12, and the data to be encoded RV13, and the register address and the command mask of the data to be encoded RV11 (RV12, RV13) are the register address RA1 (RA3, RA2) and the command mask CM11 (CM12, CM13) respectively. The preparation data Dprp stored in the memory sub-block MB2 includes the data to be encoded RV21 and the data to be encoded RV22, and the register address and the command mask of the data to be encoded RV21 (RV22) are the register address RA1 (RA3) and the command mask CM21 (CM22) respectively. One register address corresponds to one encoding register of the register group 224.

Figure 3B:
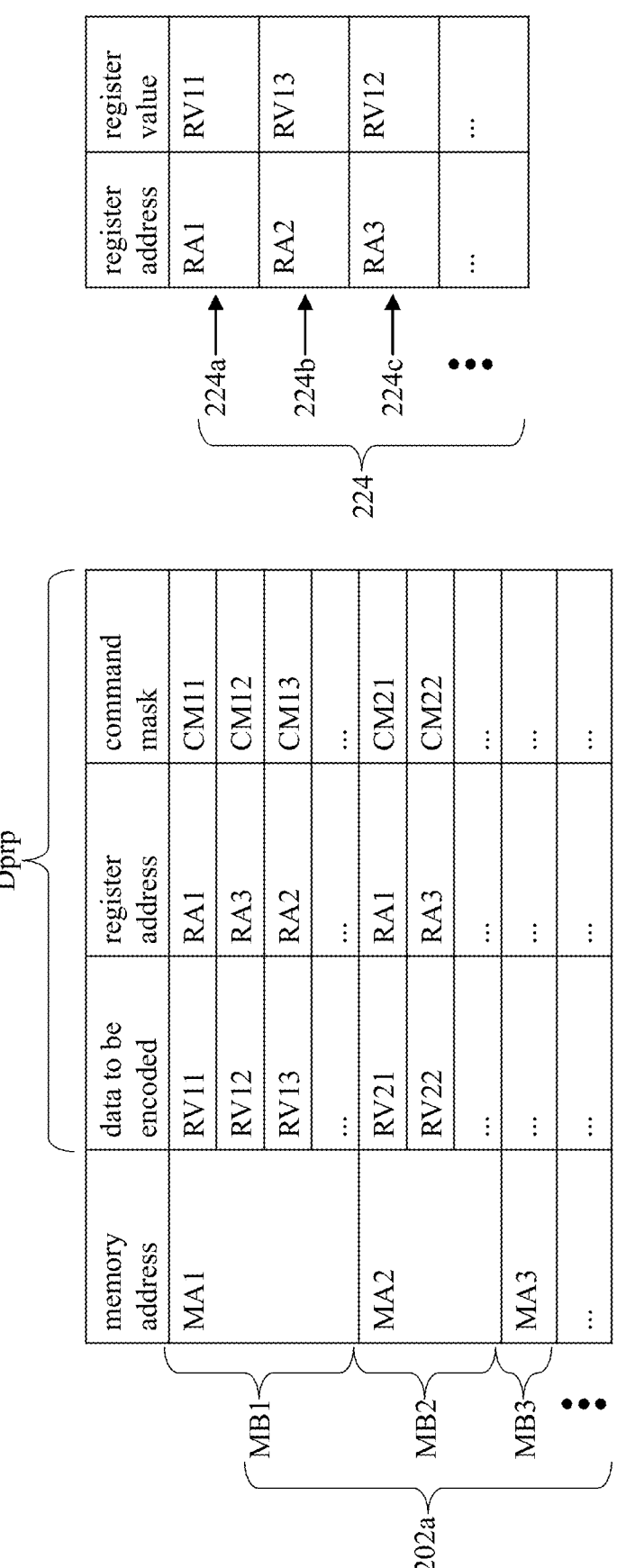
FIG. 3B is a schematic diagram of the contents of the memory block 202a and the register group 224 according to an embodiment of the present invention.

Reference is made to FIG. 3B, which is a schematic diagram of the contents of the memory block 202a and the register group 224 according to an embodiment of the present invention. The register group 224 includes a plurality of encoding registers (e.g., the encoding register 224a, the encoding register 224b, the encoding register 224c). The register group 224 is used to store the data to be encoded of a group of preparation data Dprp from the external memory 202.

The example of FIG. 3B shows that the register group 224 stores all of the data to be encoded of a group of preparation data Dprp (e.g., all of the data to be encoded in the memory sub-block MB1). More specifically, the encoding register 224a (having the register address RA1) stores the data to be encoded RV11 (i.e., the data to be encoded RV11 is the register value of the encoding register 224a), the encoding register 224b (having the register address RA2) stores the data to be encoded RV13, and the encoding register 224c (having the register address RA3) stores the data to be encoded RV12.

Note that the data to be encoded that are next to each other (i.e., stored at consecutive addresses) in the external memory 202 (e.g., the data to be encoded RV11 and the data to be encoded RV12) are not necessarily next to each other in the register group 224, and vice versa (e.g., the data to be encoded RV11 and the data to be encoded RV13). This is conducive to increasing the flexibility of the processing circuit 210 in generating the preparation data Dprp (that is to say, the location of the preparation data Dprp is not limited to the location of the corresponding encoding register in the register group 224).

Reference is made to FIG. 3A and FIG. 3B. When the control circuit 222 learns that there is an encoding task Tsk to be processed (e.g., the encoding task Tsk stored in the task register 221b), the control circuit 222 controls the data input circuit 223 to read from the corresponding memory sub-block (e.g., the memory sub-block MB2) the data to be encoded, the register address(es), and the command mask(s) and processes the data to be encoded according to whether the command mask is equal to a predetermined value. For example, if the predetermined value is "W" (indicating a write operation) and the command mask is identical to the predetermined value, then the data input circuit 223 writes the register value (e.g., the data to be encoded RV21) into the corresponding encoding register of the register group 224 (i.e., the target encoding register, for example, the encoding register 224a corresponding to the register address RA1). If the predetermined value is "R" (indicating a read operation) and the command mask is identical to the predetermined value, then the data input circuit 223 writes the data to be encoded into the target encoding register, and then the data input circuit 223 reads the value of the target encoding register to determine whether the write operation was correct. If the predetermined value is "P" (meaning skip) and the command mask is identical to the predetermined value, the data input circuit 223 does not write the data to be encoded into the target encoding register.

Continuing the previous paragraph, when a particular encoding task Tsk does not use a particular register of the register group 224, the processing circuit 210 sets the command mask corresponding to that register to "P" when preparing the preparation data Dprp corresponding to the encoding task Tsk. Such a design may simplify the arrangement of data in the memory block 202a (i.e., the processing circuit 210 may store register values corresponding to the same type or function at fixed memory addresses), thereby avoiding the hassle of rearranging the memory block 202a according to different encoding tasks Tsk.

After the data input circuit 223 writes the data to be encoded into the register group 224, the control circuit 222 controls the encoding circuit 225 to encode the image data in the register group 224 according to the parameters in the register group 224. The encoding circuit 225 generates the encoded data Decd as the encoding operation progresses. The data output circuit 226 writes the output data Dout of the encoder 220 into the memory block 202c of the external memory 202.

After the encoder 220 completes an encoding task Tsk, the control circuit 222 sends an interrupt Intr to the processing circuit 210. In response to the interrupt, the processing circuit 210 reads the output data Dout and/or the supplementary data Dsup from the external memory 202.

In some embodiments, the encoder 220 (more specifically, the control circuit 222) also stores the supplementary data Dsup (i.e., the data that the encoder 220 generates in addition to the output data Dout after performing the encoding operation) in the external memory 202 (more specifically, the memory block 202b). For example, the output data Dout includes but is not limited to the encoding type, encoding cycle, sum of absolute differences (SADs), and multiple quantization parameters, quantization parameter average, SAD statistics (e.g., distribution histogram), quantization parameter statistics of a frame, and the supplementary data Dsup includes but is not limited to the maximum value of quantization parameters, the minimum value of quantization parameters, the quantization parameter average after rate distortion optimization (RDO), and the hit rate of the code rate control algorithm. The advantage of such a design is that the control circuit 222 can share some data calculations, allowing the encoding circuit 225 to focus on encoding operations, thereby improving the encoding efficiency of the encoder 220.

In some embodiments, the data output circuit 226 first processes the encoded data Decd to obtain the output data Dout (i.e., the data output circuit 226 generates the above-mentioned quantization parameter average, SAD statistics (e.g., distribution histogram), quantization parameter statistics, and/or encoding cycle), and then writes the output data Dout into the memory block 202c. In other words, the output data Dout is data derived from the encoded data Decd.

In an alternative embodiment, the data output circuit 226 does not perform any process on the encoded data Decd (i.e., the output data Dout and the encoded data Decd are identical). That is to say, the above quantization parameter average, SAD statistics (e.g., distribution histogram), quantization parameter statistics, and/or encoding cycle are generated by the encoding circuit 225.

Figure 4:
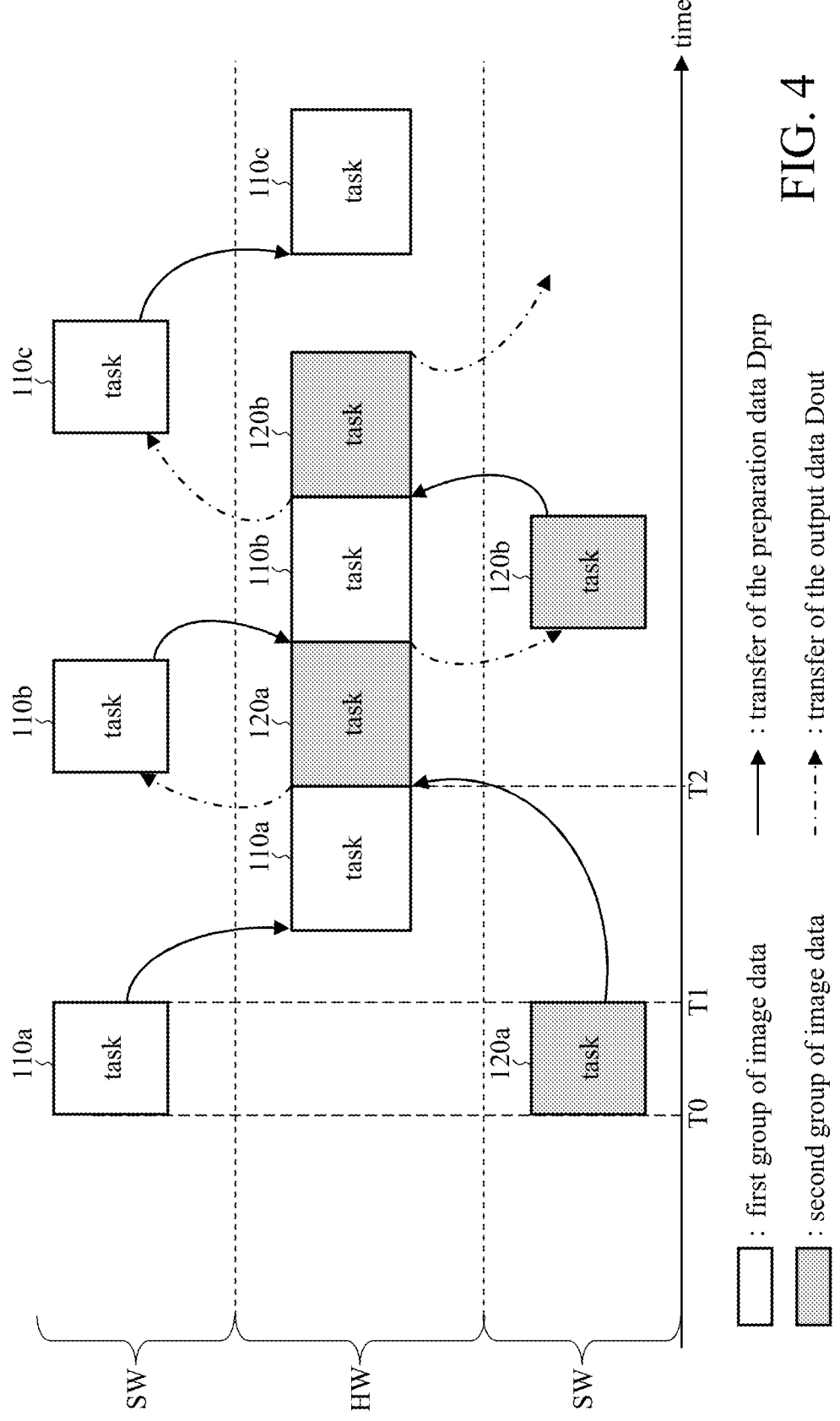
FIG. 4 is a schematic diagram of TDM according to the present invention.

Reference is made to FIG. 4, which is a schematic diagram of TDM according to the present invention. The solid arrows in FIG. 4 indicate that the processing circuit 210 (i.e., the software SW) transfers the preparation data Dprp to the encoder 220 (i.e., the hardware HW) through the external memory 202, and the dotted arrows indicate that the encoder 220 transfers the output data Dout to the processing circuit 210 through the external memory 202.

Because the processing circuit 210 can start preparing the task 110a and the task 120a at substantially the same time (at the time point TO), and can immediately store the two tasks in the external memory 202 after the preparations are completed (at the time point T1), the present invention can effectively reduce or eliminate the software idle time. On the other hand, from the hardware point of view, because the encoder 220 can store the result in the external memory 202 after completing the task 110a and immediately perform the task 120a (without having to wait for the software to obtain the encoding result of the task 110*a*), the present invention can effectively reduce or eliminate the hardware idle time. Therefore, the present invention can greatly improve the performance of the electronic device 200.

In summary, by using the external memory 202 to store the preparation data Dprp, the present invention can reduce or eliminate the software idle time and/or the hardware idle time.

Figure 5:
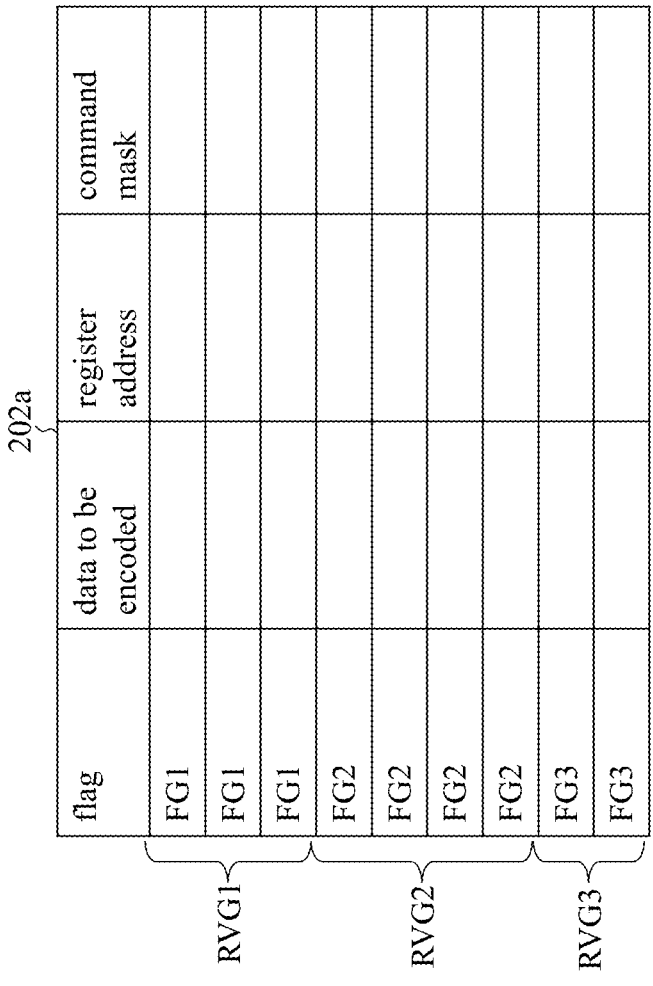
FIG. 5 is a schematic diagram of the contents of the memory block 202a according to another embodiment of the present invention.

Reference is made to FIG. 5, which is a schematic diagram of the contents of the memory block 202*a* according to another embodiment of the present invention. FIG. 5 shows the data to be encoded corresponding to a particular encoding task Tsk. In addition to the register address and command mask, each data to be encoded also corresponds to a flag. In the example of FIG. 5, the first to third data to be encoded belong to the first data group RVG1 (having a flag FG1), the fourth to seventh data to be encoded belong to the second data group RVG2 (having a flag FG2), and the eighth to ninth data to be encoded belong to the third data group RVG3 (having a flag FG3). The data group RVG1, the data group RVG2, and the data group RVG3 may correspond to different functions (e.g., associated respectively with bit rate, data storage address, and other characteristic value (including, but not limited to, enabling/disabling SAD calculation, I-frame or P-frame indication)).

Continuing the previous paragraph, generally speaking, there is a higher chance that the data to be encoded having the same function are updated or modified together. Therefore, the design of FIG. 5 has an advantage that the processing circuit 210 can selectively update or modify the relevant data to be encoded and maintain other data to be encoded according to the encoding task Tsk. For example, please refer to FIG. 4 and FIG. 5. Assuming that the data group RVG3 is related to the encoding bit rate, and the encoding bit rates of the tasks 110*a* and 110*b* are the same, when preparing the preparation data Dprp of the task 110*b*, the processing circuit 210 does not need to update the data to be encoded having the flag "FG3" (i.e., directly reuses the preparation data of the task 110*a*, whose flag is "FG3"), which can reduce the waste of software resources (which is equivalent to improving the performance of the processing circuit 210).

The processing circuit 210 may be a circuit or electronic component with program execution capabilities, such as a central processing unit (CPU), a microprocessor, a microprocessing unit, a digital signal processor (DSP), or an application specific integrated circuit (ASIC), or its equivalent circuit. The processing circuit 210 may implement its functions by executing program codes and/or program instructions stored in the external memory 202.

The control circuit 222 may be a circuit or electronic component with program execution capabilities, such as a central processing unit, a microprocessor, a microcontroller, a microprocessing unit, a DSP, or its equivalent circuit. In other embodiments, people having ordinary skill in the art can design the control circuit 222 based on the above discussion. That is to say, the control circuit 222 can be an application specific integrated circuit (ASIC) or can be embodied by circuitry or hardware such as a programmable logic device (PLD).

Figure 6:
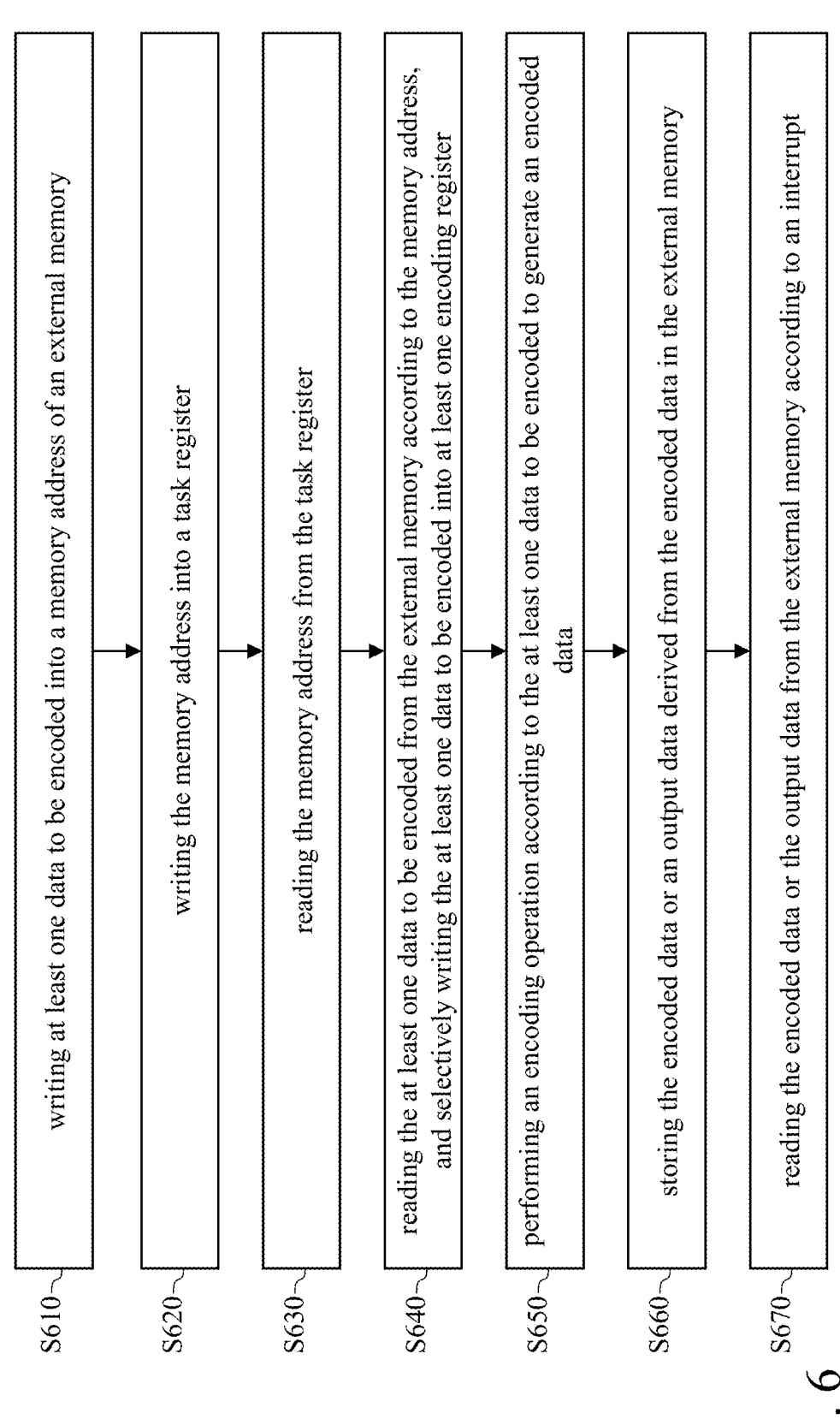
FIG. 6 is a flowchart of an operation method of an image processing chip according to an embodiment of the present invention.

In addition to the aforementioned image processing chip, the present invention also correspondingly discloses an operation method of the image processing chip. This method is executed by the aforementioned image processing chip 201 or its equivalent device. FIG. 6 is a flowchart of the operation method of the image processing chip according to an embodiment of the present invention. The flowchart includes the following steps.

Step S610: Writing at least one data to be encoded into a memory address of the external memory 202. For example, the processing circuit 210 writes the preparation data Dprp into the memory sub-block MB1 of the memory block 202*a* of the external memory 202.

Step S620: Writing the memory address into a task register. For example, the processing circuit 210 writes the memory address MA1 into the task register 221*a* of the register group 221.

Step S630: Reading the memory address from the task register. For example, the control circuit 222 reads the memory address MA1 from the task register 221*a*.

Step S640: Reading the at least one data to be encoded from the external memory 202 according to the memory address, and selectively writing the at least one data to be encoded into at least one encoding register. For example, the data input circuit 223 reads the data to be encoded RV11 from the memory sub-block MB1 of the memory block 202*a* according to the memory address MA1, and determines whether to write the data to be encoded RV11 into the encoding register 224*a* according to the command mask CM11. Refer to FIG. 3A, FIG. 3B, and related discussions.

Step S650: Performing an encoding operation according to the at least one data to be encoded to generate an encoded data Decd. For example, the encoding circuit 225 performs an encoding operation according to the register values in the register group 224 (i.e., the data to be encoded) to generate the encoded data Decd.

Step S660: Storing the encoded data Decd or an output data Dout derived from the encoded data Decd in the external memory 202. For example, the data output circuit 226 stores the output data Dout in the memory block 202*c* of the external memory 202. The output data Dout may be the encoded data Decd or data derived from the encoded data Decd.

Step S670: Reading the encoded data Decd or the output data Dout from the external memory 202 according to an interrupt. For example, the control circuit 222 generates an interrupt Intr after the encoding circuit 225 completes the encoding operation, and the processing circuit 210 reads the output data Dout from the external memory 202 according to the interrupt Intr.

In some embodiments, steps S610 to S620 and steps S630 to S660 may be performed simultaneously. More specifically, the processing circuit 210 may prepare the next data to be encoded (steps S610 to S620) while the encoder 220 performs an encoding operation according to the current data to be encoded (steps S630 to S660).

Figure 7:
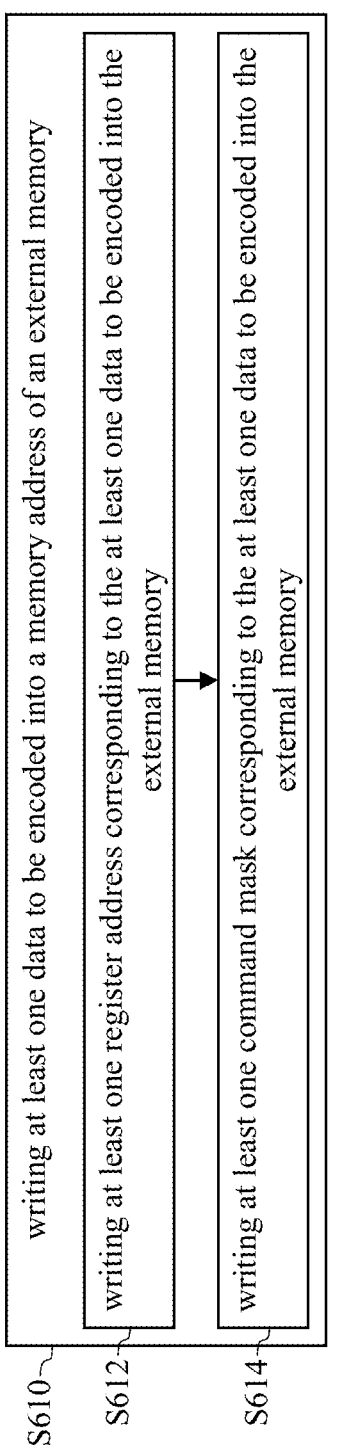
FIG. 7 shows the sub-steps of step S610 in FIG. 6 according to an embodiment.

Reference is made to FIG. 7, which is a sub-step of step S610 in FIG. 6 according to an embodiment.

Step S612: Writing at least one register address corresponding to the at least one data to be encoded into the external memory 202. For example, the processing circuit 210 writes the register address RA1 corresponding to the data to be encoded RV11 into the memory sub-block MB1 of the memory block 202*a*.

Step S614: Writing at least one command mask corresponding to the at least one data to be encoded into the external memory 202. For example, the processing circuit 210 writes the command mask CM11 corresponding to the data to be encoded RV11 into the memory sub-block MB1 of the memory block 202*a*.

Figure 8:
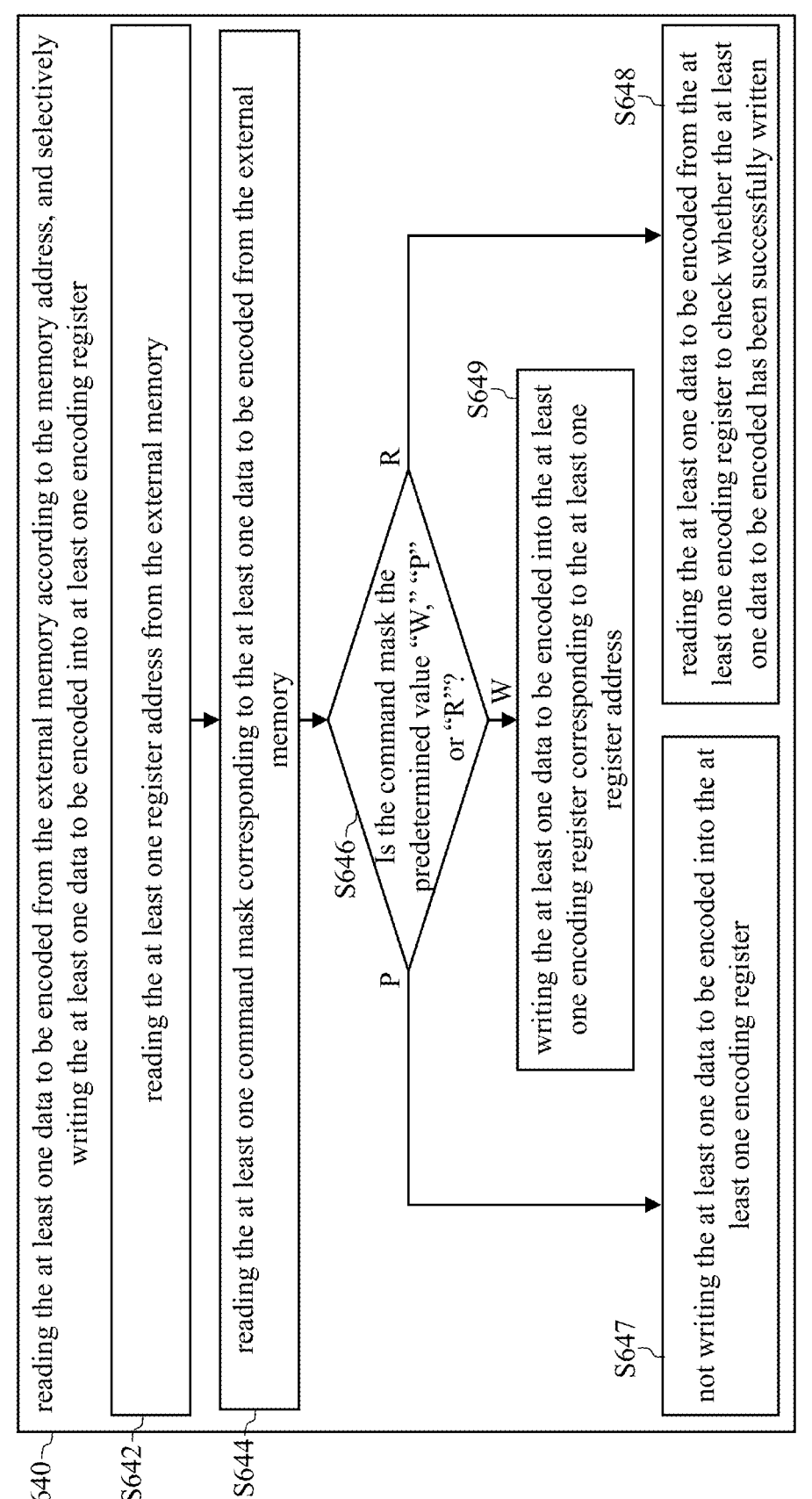
FIG. 8 shows the sub-steps of step S640 of FIG. 6 according to an embodiment.

Reference is made to FIG. 8, which is a sub-step of step S640 in FIG. 6 according to an embodiment.

Step S642: Reading the at least one register address from the external memory 202. For example, the data input circuit 223 reads the register address RA1 from the memory sub-block MB1.

Step S644: Reading the at least one command mask corresponding to the at least one data to be encoded from the external memory 202. For example, the data input circuit 223 reads the command mask CM11 corresponding to the data to be encoded RV11 from the memory block 202a.

Step S646: The data input circuit 223 determines whether the command mask is the predetermined value "W," "P" or "R."

Step S647: When the command mask is "P," the data input circuit 223 does not write the at least one data to be encoded into the at least one encoding register.

Step S648: After writing the data to be encoded (e.g., the data to be encoded RV11) into the at least one encoding register (e.g., the encoding register 224a), the data input circuit 223 reads the at least one data to be encoded from the at least one encoding register to check whether the at least one data to be encoded has been successfully written.

Step S649: Writing the at least one data to be encoded into the at least one encoding register corresponding to the at least one register address. For example, the data input circuit 223 writes the data to be encoded RV11 into the encoding register 224a corresponding to the register address RA1.

Figure 9:
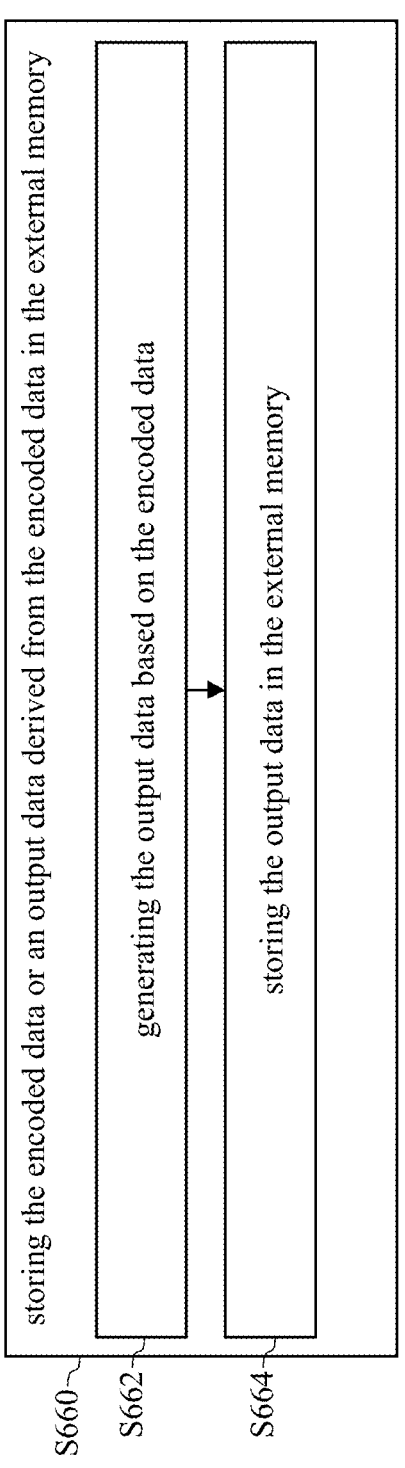
FIG. 9 shows the sub-steps of step S660 in FIG. 6 according to an embodiment.

Reference is made to FIG. 9, which shows the sub-steps of step S660 in FIG. 6 according to an embodiment.

Step S662: The data output circuit 226 generates the output data Dout based on the encoded data Decd.

Step S664: The data output circuit 226 stores the output data Dout in the memory block 202c.

Figure 10:
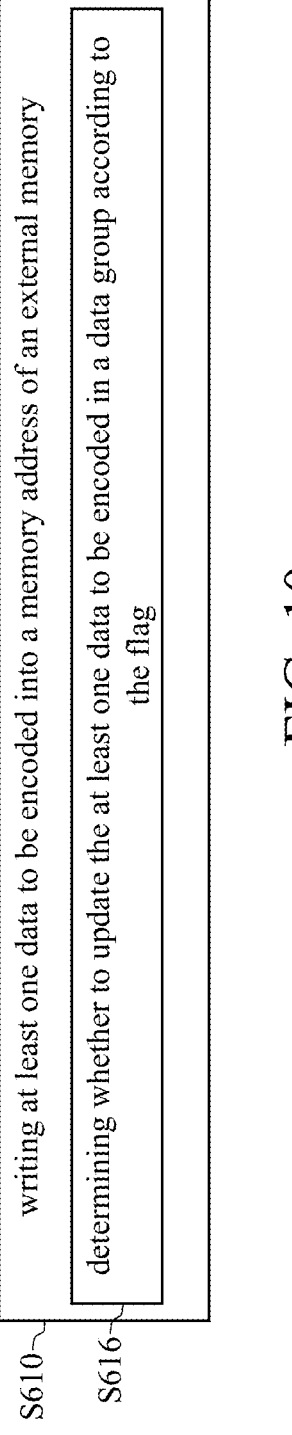
FIG. 10 shows the sub-steps of step S610 in FIG. 6.

Reference is made to FIG. 10, which shows that step S610 in FIG. 6 further includes sub-step S616: the processing circuit 210 determines whether to update the data to be encoded in a data group according to the flag. Refer to FIG. 5 and related discussions.

Figure 11:
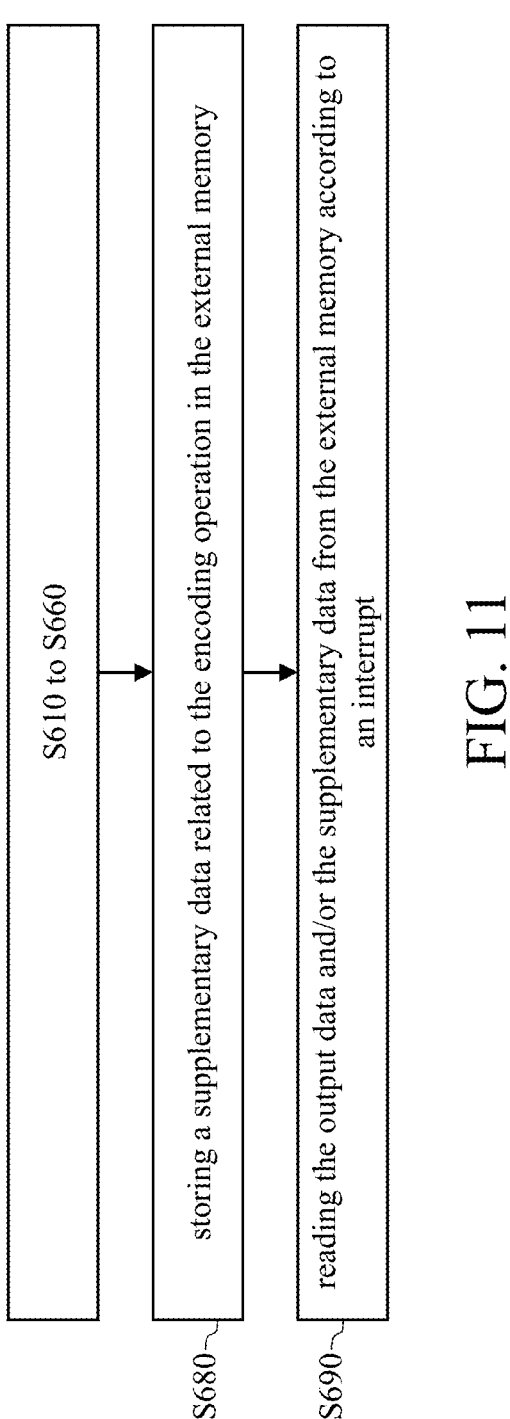
FIG. 11 is a flowchart of an operation method of an image processing chip according to another embodiment of the present invention.

FIG. 11 is a flowchart of an operation method of an image processing chip according to another embodiment of the present invention. The flowchart includes the following steps, wherein steps S610 to S660 are referred to FIG. 6.

Step S680: The control circuit 222 stores a supplementary data Dsup related to the encoding operation in the memory block 202b of the external memory 202.

Step S690: The processing circuit 210 reads the output data Dout and/or the supplementary data Dsup from the external memory 202 according to an interrupt Intr.

Figure 12:
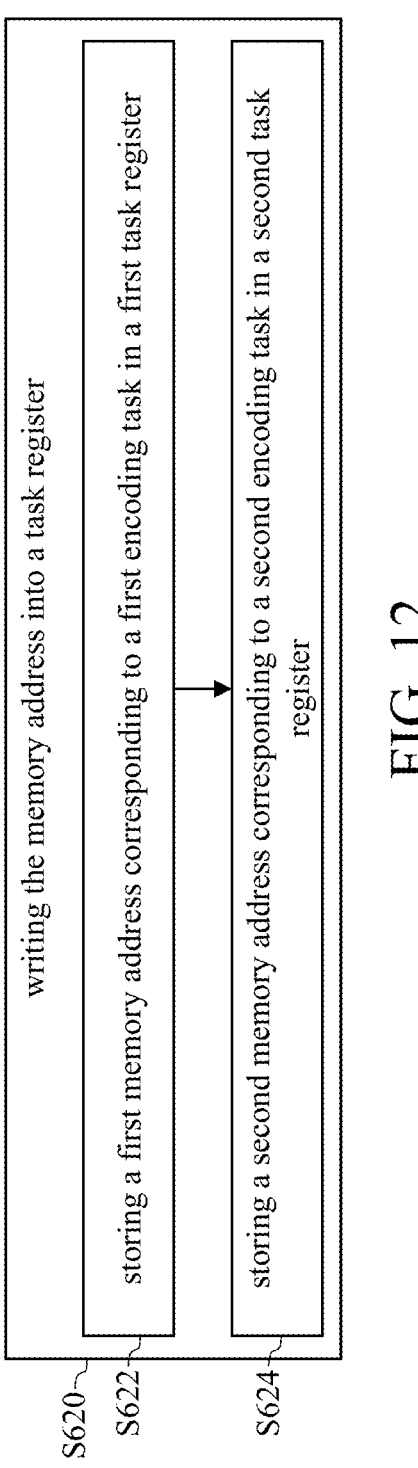
FIG. 12 shows the sub-steps of step S620 of FIG. 6.

Reference is made to FIG. 12, which shows that step S620 of FIG. 6 includes the following sub-steps. The embodiment of FIG. 12 corresponds to a scenario where the register group 221 includes more than two task registers.

Step S622: Storing a first memory address corresponding to a first encoding task in a first task register. For example, the processing circuit 210 stores the memory address MA1 corresponding to the first encoding task in the task register 221a.

Step S624: Storing a second memory address corresponding to a second encoding task in a second task register. For example, the processing circuit 210 stores the memory address MA2 corresponding to the second encoding task in the task register 221b.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An image processing chip coupled to an external memory, the image processing chip comprising:
  a processing circuit configured to write a data to be encoded and a command mask corresponding to the data into a memory address of the external memory; and
  an encoder comprising:
    a first register configured to store the memory address under control of the processing circuit;
    a second register;
    a data input circuit configured to read the command mask from the external memory according to the memory address in the first register, further read the data to be encoded from the external memory according to the memory address in the first register and write the data to be encoded into the second register when the command mask is equal to a first predetermined value; and
    an encoding circuit configured to perform an encoding operation according to the data to be encoded in the second register to generate an encoded data;
    wherein the encoder stores one of the encoded data and an output data derived from the encoded data in the external memory.

2. The image processing chip of claim 1, wherein the second register has a register address, the data to be encoded corresponds to the register address, the processing circuit further writes the register address into the external memory, and the data input circuit further reads the register address from the external memory and writes the data to be encoded into the second register according to the register address.

3. The image processing chip of claim 1, wherein when the command mask is equal to a second predetermined value, the data input circuit does not write the data to be encoded into the second register.

4. The image processing chip of claim 1, wherein when the command mask is equal to a third predetermined value, the data input circuit writes the data to be encoded into the second register and then reads the data to be encoded from the second register to check whether the data to be encoded has been successfully written.

5. The image processing chip of claim 1, wherein the encoder further comprises a data output circuit configured to generate the output data based on the encoded data and store the output data in the external memory.

6. The image processing chip of claim 5, wherein the encoded data comprises a plurality of quantization parameters, and the output data comprises an average of the plurality of quantization parameters.

7. The image processing chip of claim 1, wherein the data to be encoded belongs to a data group, the data group corresponds to a flag, and the processing circuit further determines whether to update the data to be encoded of the data group according to the flag.

8. The image processing chip of claim 1, wherein the output data is a first output data, the encoder further comprises a control circuit coupled to the first register, the data input circuit, and the encoding circuit, and the control circuit further stores a second output data related to the encoding operation in the external memory.

9. The image processing chip of claim 1, wherein the encoder processes a first encoding task and a second encoding task, the encoder further comprises a third register, the first register stores a first memory address corresponding to the first encoding task, and the third register stores a second memory address corresponding to the second encoding task.

10. The image processing chip of claim 1, wherein the data to be encoded is a first data to be encoded, the memory address is a first memory address, and when the encoder performs the encoding operation, the processing circuit writes a second data to be encoded into a second memory address in the external memory and writes the second memory address into the first register.

11. An operation method of an image processing chip, wherein the image processing chip is coupled to an external memory and comprises a first register and a second register, the operation method comprising:

(A) writing a data to be encoded and a command mask corresponding to the data into a memory address of the external memory;

(B) writing the memory address into the first register;

(C) reading the command mask from the external memory according to the memory address in the first register, further reading the data to be encoded from the external memory according to the memory address in the first register and writing the data to be encoded into the second register when the command mask is equal to a first predetermined value;

(D) performing an encoding operation according to the data to be encoded in the second register to generate an encoded data; and (E) storing one of the encoded data and an output data derived from the encoded data in the external memory.

12. The operation method of claim 11, wherein the second register has a register address, and the data to be encoded corresponds to the register address, the operation method further comprising:

writing the register address into the external memory; and reading the register address from the external memory;

wherein the operation of writing the data to be encoded into the second register is to write the data to be encoded into the second register according to the register address.

13. The operation method of claim 11, wherein when the command mask is equal to a second predetermined value, the data to be encoded is not written into the second register.

14. The operation method of claim 11 further comprising:

wherein when the command mask is equal to a third predetermined value, the data to be encoded is read from the second register to check whether the data to be encoded has been successfully written.

15. The operation method of claim 11, wherein the data to be encoded belongs to a data group, and the data group corresponds to a flag, the operation method further comprising:

determining whether to update the data to be encoded of the data group according to the flag.

16. The operation method of claim 11, wherein the output data is a first output data, the operation method further comprising:

storing a second output data related to the encoding operation in the external memory.

17. The operation method of claim 11, wherein the image processing chip further comprises a third register, and the image processing chip processes a first encoding task and a second encoding task, the operation method further comprising:

storing a first memory address corresponding to the first encoding task in the first register; and storing a second memory address corresponding to the second encoding task in the third register.

18. The operation method of claim 11, wherein the data to be encoded is a first data to be encoded, the memory address is a first memory address, and the step (A) or the step (B) is executed simultaneously with the step (D) to write a second data to be encoded into a second memory address in the external memory and write the second memory address into the first register.

\* \* \* \* \*